United States Patent
Kim et al.

(10) Patent No.: US 11,167,736 B2
(45) Date of Patent: *Nov. 9, 2021

(54) POSTURE INFORMATION BASED PEDESTRIAN DETECTION AND PEDESTRIAN COLLISION PREVENTION APPARATUS AND METHOD

(71) Applicants: Hyundai Motor Company, Seoul (KR); Kia Motors Corporation, Seoul (KR)

(72) Inventors: Yoon Soo Kim, Gyeonggi-do (KR); Seung Wook Park, Gyeonggi-do (KR); Min Byeong Lee, Gyeonggi-do (KR); Ho Choul Jung, Gyeonggi-do (KR); In Yong Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,409

(22) Filed: Dec. 6, 2017

(65) Prior Publication Data

US 2018/0186349 A1    Jul. 5, 2018

(30) Foreign Application Priority Data

Dec. 30, 2016  (KR) .................. 10-2016-0184296

(51) Int. Cl.
  *B60T 7/22*     (2006.01)
  *G06K 9/00*    (2006.01)
  (Continued)

(52) U.S. Cl.
  CPC .............. *B60T 7/22* (2013.01); *B60Q 1/44* (2013.01); *B60Q 9/008* (2013.01); *B60W 30/09* (2013.01);
  (Continued)

(58) Field of Classification Search
  None
  See application file for complete search history.

(56) References Cited

U.S. PATENT DOCUMENTS 6,488,109 B1 *  12/2002  Igaki .................. B60T 8/17557
                                                      180/169
9,336,436 B1 *   5/2016  Dowdall ............ G06K 9/00362
(Continued)

FOREIGN PATENT DOCUMENTS

CN    102542843 A     7/2012
CN    102741901 A    10/2012
(Continued)

OTHER PUBLICATIONS

Extended European Search Report for European U.S. Appl. No. 17/205,454, dated May 30, 2018, 12 pages.
(Continued)

*Primary Examiner* — Nicholas K Wiltey
(74) *Attorney, Agent, or Firm* — Mintz Levin Cohn Ferris Glovsky and Popeo, P.C.; Peter F. Corless (57) ABSTRACT

An apparatus for operating a pedestrian detection and collision mitigation system (PDCMS) of a vehicle is provided. The apparatus includes a front detection sensor that detects a pedestrian in a driving lane of the vehicle and a distance and a relative speed between the pedestrian and the vehicle. A vehicle sensor detects a vehicle speed and a controller executes the PDCMS function based on information detected by the front detection sensor and the vehicle sensor. A warning unit then outputs a notification to a driver regarding a collision of the pedestrian with the vehicle.

14 Claims, 5 Drawing Sheets

(51) Int. Cl.
    *B60W 30/095*     (2012.01)
    *B60W 30/09*     (2012.01)
    *B60Q 1/44*     (2006.01)
    *B60Q 9/00*     (2006.01)
    *G06K 9/32*     (2006.01)
    *G08G 1/16*     (2006.01)
    *B60W 50/14*     (2020.01)

(52) U.S. Cl.
    CPC .... *B60W 30/0953* (2013.01); *B60W 30/0956* (2013.01); *G06K 9/00342* (2013.01); *G06K 9/00362* (2013.01); *G06K 9/00805* (2013.01); *G06K 9/3233* (2013.01); *G08G 1/166* (2013.01); *B60T 2201/024* (2013.01); *B60T 2210/32* (2013.01); *B60T 2250/04* (2013.01); *B60T 2270/30* (2013.01); *B60W 2050/143* (2013.01); *B60W 2050/146* (2013.01); *B60W 2420/42* (2013.01); *B60W 2520/10* (2013.01); *B60W 2554/00* (2020.02); *B60W 2555/20* (2020.02); *B60W 2710/182* (2013.01); *B60W 2720/10* (2013.01)

(56) References Cited

U.S. PATENT DOCUMENTS

| | | | | |
|---|---|---|---|---|
| 10,435,018 | B2 * | 10/2019 | Kim | G06K 9/00268 |
| 10,870,429 | B2 * | 12/2020 | Kim | B60W 30/0956 |
| 2005/0046272 | A1 * | 3/2005 | Rieth | B60T 7/042 |
| | | | | 303/113.4 |
| 2005/0111698 | A1 | 5/2005 | Kawai | |
| 2005/0288146 | A1 * | 12/2005 | Englisch | B60K 6/485 |
| | | | | 477/2 |
| 2008/0021617 | A1 | 1/2008 | Baumann et al. | |
| 2008/0199050 | A1 * | 8/2008 | Koitabashi | B60R 1/00 |
| | | | | 382/107 |
| 2011/0032119 | A1 * | 2/2011 | Pfeiffer | B60K 35/00 |
| | | | | 340/905 |
| 2012/0185130 | A1 * | 7/2012 | Ekchian | B60Q 1/2603 |
| | | | | 701/36 |
| 2012/0300078 | A1 * | 11/2012 | Ogata | G08G 1/166 |
| | | | | 348/148 |
| 2014/0129001 | A1 * | 5/2014 | Staudenmaier | G08B 21/06 |
| | | | | 700/79 |
| 2014/0169624 | A1 * | 6/2014 | Jung | G06K 9/00369 |
| | | | | 382/103 |
| 2014/0176350 | A1 * | 6/2014 | Niehsen | B62D 15/025 |
| | | | | 340/988 |
| 2014/0183933 | A1 * | 7/2014 | Kuhlman | B60T 1/10 |
| | | | | 303/3 |
| 2014/0324330 | A1 * | 10/2014 | Minemura | G08G 1/16 |
| | | | | 701/301 |
| 2015/0161796 | A1 * | 6/2015 | Choi | H04N 5/33 |
| | | | | 348/77 |
| 2016/0272172 | A1 | 9/2016 | Lee | |
| 2016/0375900 | A1 * | 12/2016 | Laur | B60W 30/09 |
| | | | | 701/41 |
| 2017/0015260 | A1 * | 1/2017 | Mack | G02B 27/017 |
| 2017/0329329 | A1 * | 11/2017 | Kamhi | B60W 50/14 |
| 2018/0186368 | A1 * | 7/2018 | Kim | B60W 30/0953 |
| 2018/0190120 | A1 * | 7/2018 | Kim | B60W 30/09 |

FOREIGN PATENT DOCUMENTS

| | | |
|---|---|---|
| CN | 104700114 A | 6/2015 |
| DE | 102010053350 A1 | 6/2012 |
| DE | 102011112985 A1 | 3/2013 |
| EP | 3342664 A1 | 7/2018 |
| JP | H06-107141 A | 4/1994 |
| JP | 2008-143372 A | 6/2008 |
| JP | 2008-171140 A | 7/2008 |
| JP | 2008-282097 A | 11/2008 |
| JP | 2011-063187 A | 3/2011 |
| JP | 2011-225159 A | 11/2011 |
| JP | 2013-089129 A | 5/2013 |
| KR | 20130021990 A | 3/2013 |
| WO | 2016002006 A1 | 1/2016 |

OTHER PUBLICATIONS

Franke, U. et al., "Making Bertha See", IEEE, International Conference on Computer Vision Workshops, pp. 214-221 (2013).

Office Action for Korean Patent Application No. 10-2016-0184296, dated Feb. 21, 2019, English translation, 16 pages.

* cited by examiner

POSTURE INFORMATION BASED PEDESTRIAN DETECTION AND PEDESTRIAN COLLISION PREVENTION APPARATUS AND METHOD

CROSS-REFERENCE TO RELATED APPLICATION

This application claims the benefit of priority to Korean Patent Application No. 10-2016-0184296, filed on Dec. 30, 2016 with the Korean Intellectual Property Office, the entire disclosure of which is incorporated herein by reference in its reference.

BACKGROUND

(a) Technical Field

Exemplary embodiments of the present disclosure relate to a pedestrian detection and a pedestrian collision prevention apparatus and method, and more particularly, to an apparatus and a method for operating a pedestrian detection and collision mitigation system (PDCMS) of a vehicle capable of recognizing a pedestrian by analyzing an image in front of the vehicle and protecting the pedestrian by operating a PDCMS function when an accident risk is detected.

(b) Description of the Related Art

Recently, advanced driver assistance systems (ADAS) are being developed to assist a driver with operating a vehicle. The ADAS has multiple sub-technology categories. For example, the ADAS includes a pedestrian detection and collision mitigation system (PDCMS). The PDCMS is a technology that warns a driver of a potential pedestrian collision when a collision of a pedestrian with a vehicle is expected and automatically activates an emergency brake.

Since injury rates of pedestrian-related traffic accidents are increasing, the PDCMS system is capable of helping reduce a speed of the vehicle against inevitable pedestrian collisions, thereby alleviating pedestrian impacts and reducing the lethality and the injury rates. Therefore, a technology development for specific application of the PDCMS has been required.

SUMMARY

An object of the present disclosure is to provide a system for more safely protecting a pedestrian by more accurately operating a PDCMS function. In particular, an object of the present disclosure is to provide an apparatus for operating a PDCMS that may include a front detection sensor configured to detect a presence of a pedestrian and measure a distance and a relative speed between a vehicle and a pedestrian, based on posture information of a pedestrian in an image of the front of the vehicle with a higher accuracy.

Other objects and advantages of the present disclosure may be understood by the following description, and become apparent with reference to the exemplary embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an apparatus for operating a pedestrian detection and collision mitigation system (PDCMS) operating of a vehicle may include: a front detection sensor configured to detect a pedestrian in a driving lane of the vehicle and detect or measure a distance and a relative speed between the pedestrian and the vehicle; a vehicle sensor configured to detect a speed of the vehicle; a controller (e.g., an electronic control unit) configured to operate the PDCMS function based on information detected by the front detection sensor and the vehicle sensor; and a warning unit operated to inform a driver of a potential collision of the pedestrian with the vehicle controller.

In addition, the front detection sensor may include an image input unit configured to acquire an image of an in front of the vehicle; a region of interest (ROI) setting unit configured to set a ROI that corresponds to a size of an object in the image; a candidate extraction unit configured to extract a pedestrian candidate based on an operation of the object in the set ROI; and a pedestrian determination unit including a database and configured to compare the extracted pedestrian candidate with a posture of a sample pedestrian stored in the database to identify whether the pedestrian candidate corresponds to the pedestrian. The PDCMS function may include an activation of an operation of the warning unit and an activation of an operation of a brake regardless of whether the driver operates the brake.

The pedestrian determination unit may include the database configured to store, as the posture of the sample pedestrian, information associated with at least one of front, back, left, and right portions, an upper left half of a body, and an upper right half of a body of the sample pedestrian in the database. The pedestrian determination unit may further be configured to compare the extracted pedestrian candidate with front, back, left, and right portions, an upper left half of a body, or an upper right half of a body of the sample pedestrian in the database in a cascade manner. The front detection sensor may further include a pedestrian tracking unit configured to track the pedestrian identified by the pedestrian determination unit. The pedestrian tracking unit may be configured to track the pedestrian based on the number of feature points of the pedestrian in the set ROI.

The controller may be configured to activate the operation of the brake to reduce the speed of the vehicle to at least a predetermined speed or less from time when the operation of the brake is activated to time when the collision of the pedestrian with the vehicle occurs. The controller may be configured to permit a driver to operate the brake for a maximum possible deceleration even after starting the activation of the operation of the brake. The controller may also be configured to operate the warning unit to inform the driver that the PDCMS function is in an available state.

The warning unit may include a display unit configured to visually inform a driver of the collision of the pedestrian with the vehicle or a speaker unit configured to audibly inform the driver of the collision of the pedestrian with the vehicle. The PDCMS function may further include an operation of a rear brake lamp. The PDCMS function may further include an operation of an electrical stability control (ESC).

In accordance with another aspect of the present disclosure, a method for operating a pedestrian detection and collision mitigation system (PDCMS) of a vehicle may include: acquiring an image of an area in front of a vehicle; setting a region of interest (ROI) that corresponds to a size of an object in the image; extracting a pedestrian candidate based on an operation of the object in the set ROI; including a database and comparing the extracted pedestrian candidate with a posture of a sample pedestrian in the database to identify whether the pedestrian candidate corresponds to a in on a driving lane of the vehicle; detecting pedestrian information including a distance and a relative speed between the pedestrian and the vehicle; detecting vehicle information including a speed of a vehicle; and operating a PDCMS function based on the pedestrian information and the vehicle information, in which the PDCMS function may include an activation of an operation of a warning unit operated to inform a driver of a collision of the pedestrian with the vehicle and an activation of an operation of a brake regardless of whether the driver operates the brake.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art may easily practice the present disclosure. As those skilled in the art would realize, the described exemplary embodiments may be modified in various different ways, all without departing from the spirit or scope of the present disclosure.

A part irrelevant to the description will be omitted to clearly describe the present disclosure, and the same elements will be designated by the same reference numerals throughout the specification. Throughout the present specification, when any one part is referred to as being "connected to" another part, it means that any one part and another part are "directly connected to" each other or are "electrically connected to" each other with the other part interposed therebetween.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present disclosure.

The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

Figure 1:
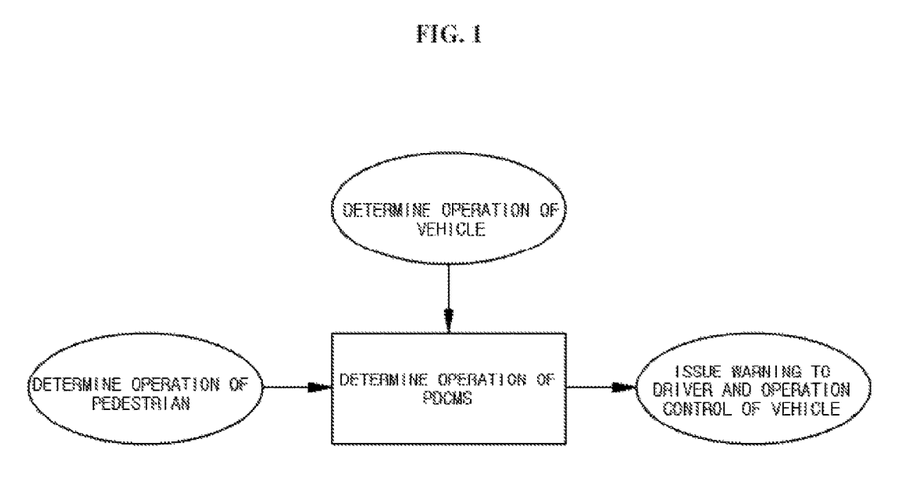
FIG. 1 is a diagram illustrating a schematic concept of a PDCMS according to an exemplary embodiment of the present disclosure.

FIG. 1 is a diagram illustrating a schematic concept of a PDCMS. The PDCMS is a technology that warns a driver of a pedestrian collision when a collision of a pedestrian with a vehicle is expected and automatically activates an emergency brake.

Referring to FIG. 1, whether the PDCMS is operated may be determined based on an operation determination of a pedestrian and an operation determination of a vehicle. When the operation of the PDCMS is determined, the PDCMS function may be performed by outputting a warning to driver and activating a vehicle control. A system designer may design the PDCMS function to operate solely in the risk of collision of a pedestrian with a vehicle or may design the PDCMS function to operate in a combination with other driving assistance systems.

Figure 2:
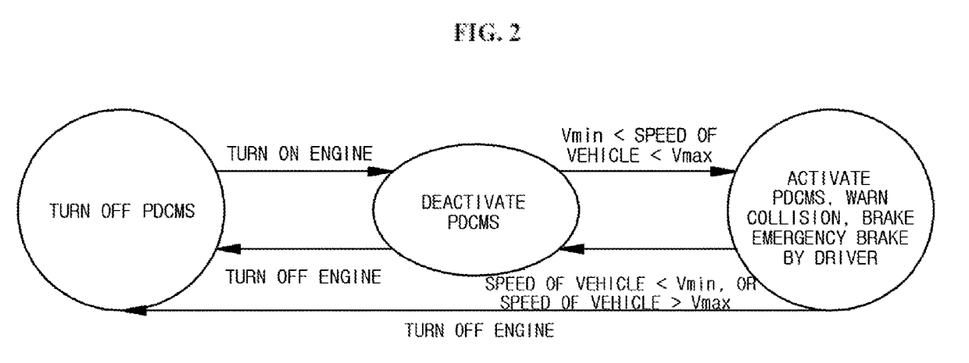
FIG. 2 is a block diagram illustrating a change in a PDCMS state according to a vehicle according to an exemplary embodiment of the present disclosure.

FIG. 2 is a block diagram illustrating a change in a PDCMS state according to a vehicle. In a PDCMS off state, no action is executed on the operation of the vehicle. The PDCMS off state occurs when an engine of a vehicle stalls. In the PDCMS deactivation state, the apparatus for operating a PDCMS may be configured to monitor a speed of a vehicle and determine whether the PDCMS is in an appropriate state to activate. The PDCMS deactivation state may be achieved by turning on the engine in the PDCMS off state. Further, the PDCMS deactivation state may be performed even when the vehicle is in a state other than the conditions that the vehicle is activated from the PDCMS activation state. For example, when the speed of the vehicle decreases to below a predetermined value Vmin, the PDCMS deactivation state is established.

The PDCMS activation state may be established when the speed of the vehicle is equal to or greater than the predetermined value Vmin and equal to or less than a predetermined value Vmax. To determine whether to operate the PDCMS function in the PDCMS activation state, an operation of a pedestrian and an operation of a vehicle may be monitored. When the apparatus for operating a PDCMS determines that the PDCMS function needs to be operated, the PDCMS function may be started. The PDCMS function may include a collision warning to a driver and an operation of an emergency brake or optionally may include braking actions by a driver.

Figure 3:
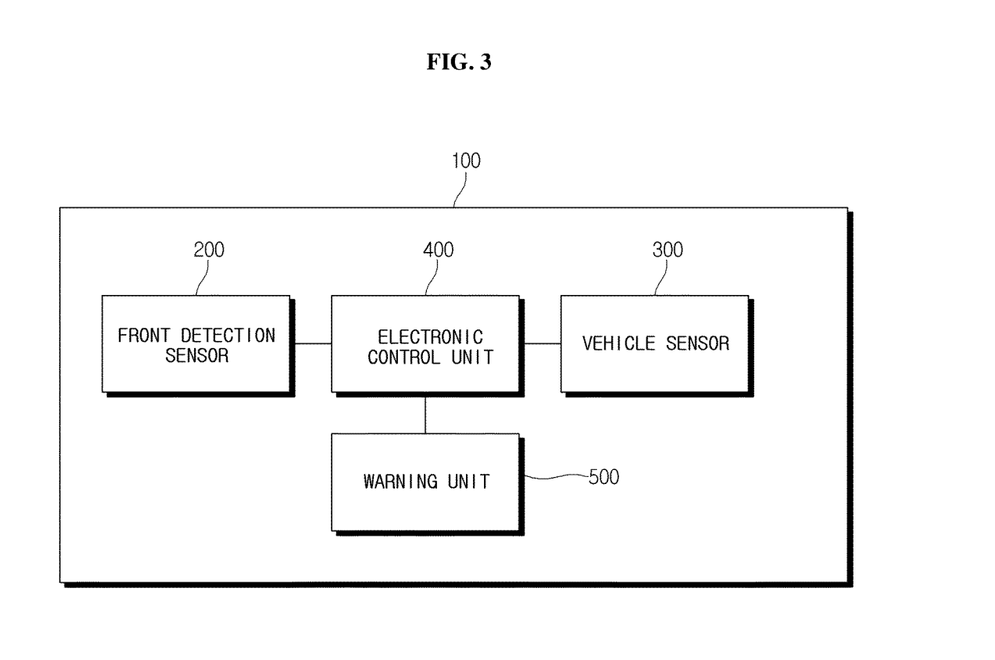
FIG. 3 is a block diagram schematically illustrating an apparatus for operating a PDCMS of a vehicle according to an exemplary embodiment of the present disclosure.

FIG. 3 is a block diagram schematically illustrating an apparatus for operating a PDCMS of a vehicle according to an exemplary embodiment of the present disclosure. Referring to FIG. 3, an apparatus 100 for operating a PDCMS of a vehicle according to an exemplary embodiment of the present disclosure may include a front detection sensor 200, a vehicle sensor 300, a controller 400, and a warning unit 500. The controller 400 may be configured to operate the other various components of the apparatus 100. In particular, the front detection sensor 200 may be configured to detect a pedestrian by setting a region of interest (ROI) in an image of an area in front of a vehicle acquired using an imaging device (e.g., a camera, video camera, or the like).

A method for determining a pedestrian based on the ROI setting of the front detection sensor 200 according to an exemplary embodiment of the present disclosure will be described in detail with reference to FIG. 4. The front detection sensor 200 may be configured to extract characteristics of obstacles detected in front of a vehicle to identify objects and detect various objects such as vehicles on a roadside as well as a pedestrian. The front detection sensor 200 may be configured to detect a pedestrian even when only a part of a pedestrian covered by various objects such as vehicles on a roadside is detected by detecting parts that form a pedestrian as well as the overall appearance of the pedestrian. Further, the front detection sensor 200 may be configured to detect a distance and a relative speed between a pedestrian and a vehicle (e.g., a subject vehicle or a traveling vehicle) when an object in front of the vehicle is determined as the pedestrian. The front detection sensor 200 may then be configured to transmit information regarding the detected pedestrian to a controller 400.

The vehicle sensor 300 may be configured to measure revolutions per minute (RPM) of a vehicle wheel based on a vehicle engine and calculate a driving speed of a vehicle based on the known circumference of the wheel and the measured RPM and time. Further, the vehicle sensor 300 may also be configured to detect information regarding the driving environment of the vehicle by including a rain sensor, a temperature sensor, an illuminance sensor, etc. The vehicle sensor 300 may then be configured to transmit the information regarding the detected driving conditions and driving environment of the vehicle to the controller 400.

The controller 400 may be configured to determine whether to operate the PDCMS function of the vehicle based on the information received from the front detection sensor 200 and the vehicle sensor 300. Specifically, the controller 400 may be configured to determine whether the conditions that the PDCMS function may be operated are satisfied by combining the pedestrian state and the vehicle state. In other words, the controller 400 may be configured to determine the risk of collision between a vehicle and a pedestrian using a current position of the pedestrian, a current position of the vehicle, and speed information of the vehicle in response to determining that an obstacle is the pedestrian.

For example, when the distance between the pedestrian and the vehicle is less than a predetermined distance and a motion direction of the pedestrian and a movement direction of the vehicle are the same, the collision risk is determined to be likely, and therefore the conditions that the PDCMS function may be operated are satisfied. When the distance between the pedestrian and the vehicle is less the predetermined distance but the motion direction of the pedestrian and the movement direction of the vehicle are different, the collision is less likely to occur, and therefore the conditions that the PDCMS function may be operated are not satisfied.

In particular, the controller 400 may be configured to determine whether the conditions that the PDCMS function may be operated are satisfied based on a mapping table. The mapping table will be described below with reference to FIG. 6. The controller 400 may be configured to execute the PDCMS function of the vehicle in response to determining that the pedestrian state and the vehicle state satisfy the conditions that the PDCMS function may be started. The PDCMS function may include operating the warning unit 500 to warn the driver of the collision regarding the pedestrian with the vehicle or operating the brake without the operation of the driver (e.g., operation of the brake without user interference or intention).

The warning of the driver regarding the collision of the pedestrian with the vehicle may be executed by operating the warning unit 500. The warning unit 500 may be operated by the controller 400 and the warning unit 500 may include a display unit or a speaker unit. The display unit may provide a driver with a visual warning through a head-up display, a navigation display, etc. The speaker unit may provide a driver with an audible warning through an audio output (e.g., a speaker). The content of the warning that the warning unit 500 performs may include a potential risk of collision of the pedestrian with the vehicle since an obstacle exists in the front of a driving lane of the vehicle (e.g., an object is detected in the driving lane of the vehicle).

The activation of the operation of the brake regardless of whether the driver operates the brake may be performed only by the controller 400 without the operation of the driver. The activation of the operation of the brake is to automatically reduce the relative speed between the vehicle and the pedestrian in response to determining that the pedestrian collision imminent.

Additionally, the activation of the operation of the brake is performed to reduce the speed of the vehicle to at least a predetermined speed or less from the time when the operation of the brake is activated to the time when the collision of the pedestrian with the vehicle occurs. For example, the predetermined speed may be about 20 km/h. Further, even after the activation of the operation of the brake starts, the driver manually operates the brake, thereby performing the maximum possible deceleration. In other words, the driver may manually operate the brake to further reduce the speed of the vehicle. For example, the driver may manually operate the brake to reduce the speed of the vehicle to about 20 km/h or less.

Further, the controller 400 may be configured to inform a driver that the PDCMS function is in an available state. Specifically, the controller 400 may be configured to operate the warning unit 500 to inform the driver that the PDCMS function is in the available state through the display unit or the speaker unit of the warning unit 500. In addition, the PDCMS function may be configured to operate a brake lamp to prevent the potential risk of collision with the following vehicles.

In addition, the PDCMS function may further include an operation of an electrical stability control (ESC). The ESC is an apparatus that allows a vehicle itself to intervene in an operation of a brake in an emergency situation such as an oversteer (when a vehicle enters inwardly beyond a turning radius of a road) or an understeer (when a vehicle deviates outwardly beyond the turning radius of the road) of a vehicle to help a driver to safely escape from an emergency situation.

Figure 4:
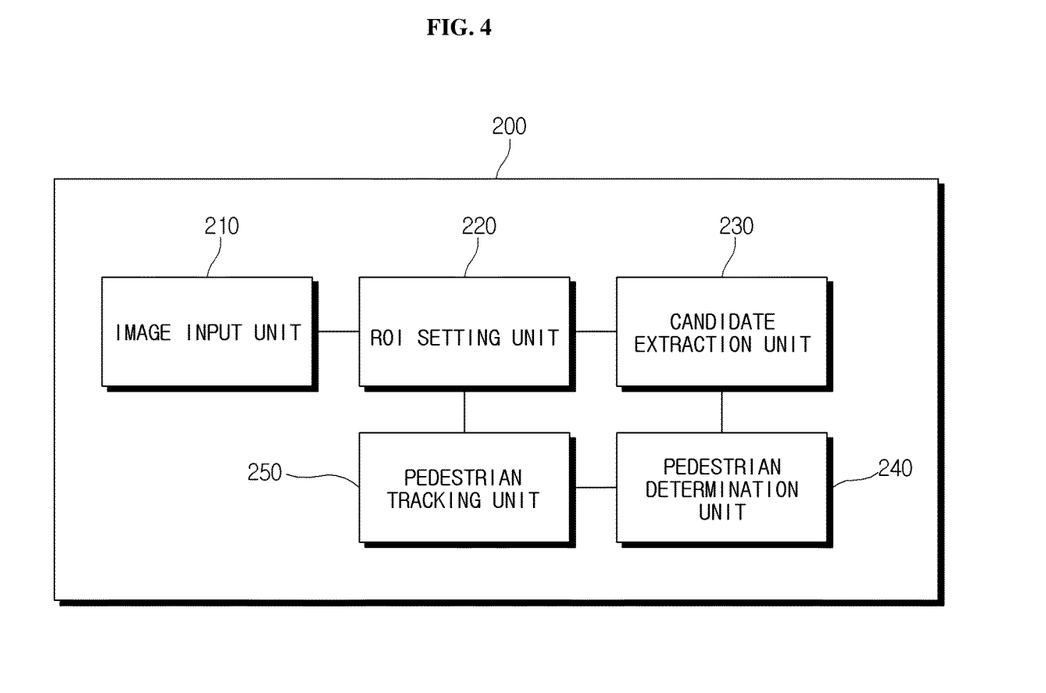
FIG. 4 is a configuration diagram of a front detection sensor according to an exemplary embodiment of the present disclosure.

FIG. 4 is a configuration diagram of a front detection sensor according to an exemplary embodiment of the present disclosure. Referring FIG. 4, the front detection sensor 200 according to an exemplary embodiment of the present disclosure may include an image input unit 210, a region of interest (ROI) setting unit 220, a candidate extraction unit 230, a pedestrian determination unit 240, and a pedestrian tracking unit 250. Each unit of the front detection sensor 200 may be operated by the controller 400.

Particularly, the image input unit 210 may be configured to receive an image acquired by a camera that photographs a front area of a vehicle. The ROI setting unit 220 may be configured to set an ROI that corresponds to a size of an object in an image in the area in front of a vehicle received through the image input unit 210. In other words, the ROI setting unit 220 may be configured to use a size of the image, installation environment information on the camera, specifications of the camera, and an actual size of a pedestrian to determine a floor position of a pedestrian area in the image. Therefore, since the pedestrian may be identified based on the number of pixels, the ROI setting unit 220 may be configured to set the minimum and maximum size of the pedestrian from the floor position of the pedestrian area to be an appropriate ROI.

Figure 5:
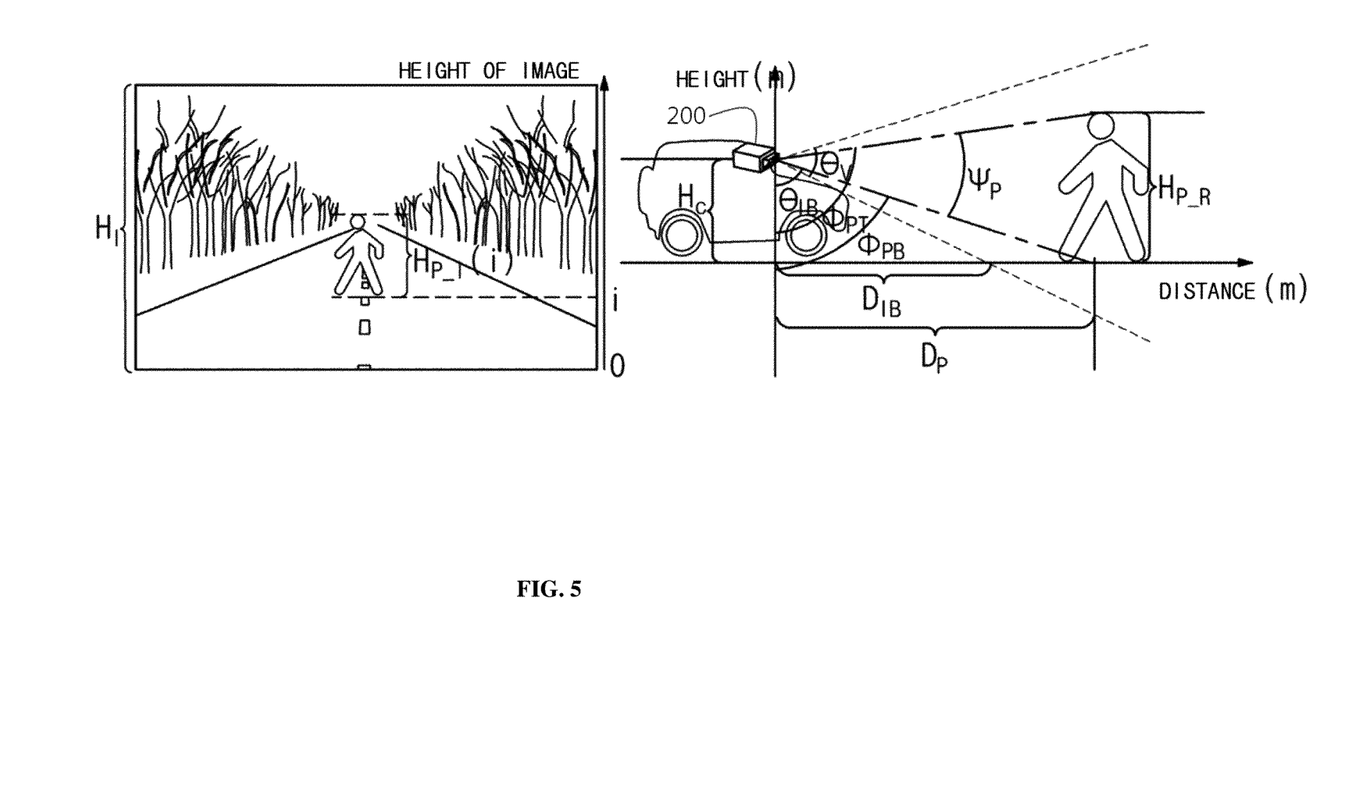
FIG. 5 is an exemplified diagram illustrating ROI setting according to an exemplary embodiment of the present disclosure.

FIG. 5 is an exemplified diagram illustrating ROI setting according to an exemplary embodiment of the present disclosure. Referring to FIG. 5, the installation environment information on the front detection sensor 200 may be expressed by the following Equation 1.

$$H_{P,j}(i) = \frac{\psi_P(i)}{\theta_V} \times H_i \quad \text{Equation 1}$$

$$\psi_P(i) = \phi_{PT}(i) - \phi_{PB}(i)$$

$$\phi_{PT}(i) = \begin{cases} \arctan\left(\frac{H_{P\_R} - H_C}{D_P(i)}\right) + 90° & \text{if } H_C < H_{P\_R} \\ 90° - \arctan\left(\frac{H_C - H_{P\_R}}{D_P(i)}\right) & \text{otherwise} \end{cases}$$

$$D_P(i) = \tan[\phi_{PB}(i)] \times H_C$$

$$\phi_{PB}(i) = i \times \frac{\theta_V}{H_i} + \theta_{IB}$$

$$\theta_{IB} = \arctan\left(\frac{D_{IB}}{H_C}\right)$$

In Equation (1), the respective symbols have the following meanings. i: Floor position of the pedestrian area in the image; $H_{P\_1}$: Size (height) of the pedestrian area in the image; $\psi_P$: Angle in a vertical direction which is occupied by the pedestrian; $H_1$: Size (height) of the input image; $\phi_{PT}$: Angle up to a crown of a pedestrian's head; $\phi_{PB}$: Angle up to a tip of a pedestrian's toe; $H_{P\_R}$: Size (height) of the pedestrian; $D_P$: Distance up to the pedestrian; $H_C$: Height at which the camera is installed; $\theta_V$: Angle in a vertical direction of the camera; $\theta_{IB}$: Angle up to an actual position corresponding to a starting point of the image; and $D_{IB}$: Distance up to an actual position corresponding to the starting point of the image.

The candidate extraction unit 230 may be configured to extract a pedestrian candidate based on an operation of an object having the ROI set by the ROI setting unit 220. The pedestrian determination unit 240 may be configured to identify the pedestrian by comparing the pedestrian candidate extracted by the candidate extraction unit 230 with a posture of a sample pedestrian in a pedestrian feature database.

Although not illustrated, the pedestrian determining unit 240 may include a database for storing, as the posture of the sample pedestrian, information associated with front, back, left, and right portions, an upper left half of a body, or an upper right half of a body of the sample pedestrian. Therefore, the pedestrian determining unit 240 may be configured to compare the features of the pedestrian candidate extracted by the candidate extraction unit 230 with the posture of the sample pedestrian stored in the database sequentially, for example, in a cascade manner (e.g., descending order), thereby determining whether the pedestrian candidate corresponds to a pedestrian.

For example, the postures of the sample pedestrian in the database which are compared with the features of the pedestrian candidate may be in the order of the front, back, left, and right portions, the upper left half of the body, and the upper right part of the body of the sample pedestrian. However, the postures are not necessarily limited to such a cascading order.

Further, the pedestrian tracking unit 250 may be configured to track the pedestrian identified by the pedestrian determination unit 240. For example, the pedestrian tracking unit 250 may be configured to track the pedestrian based on the number of feature points of the pedestrian in the ROI. The front detection sensor 200 may be configured to detect gaze information of the pedestrian and the distance and the relative speed between the pedestrian and the vehicle by the tracking of the pedestrian tracking unit 250.

Figure 6:
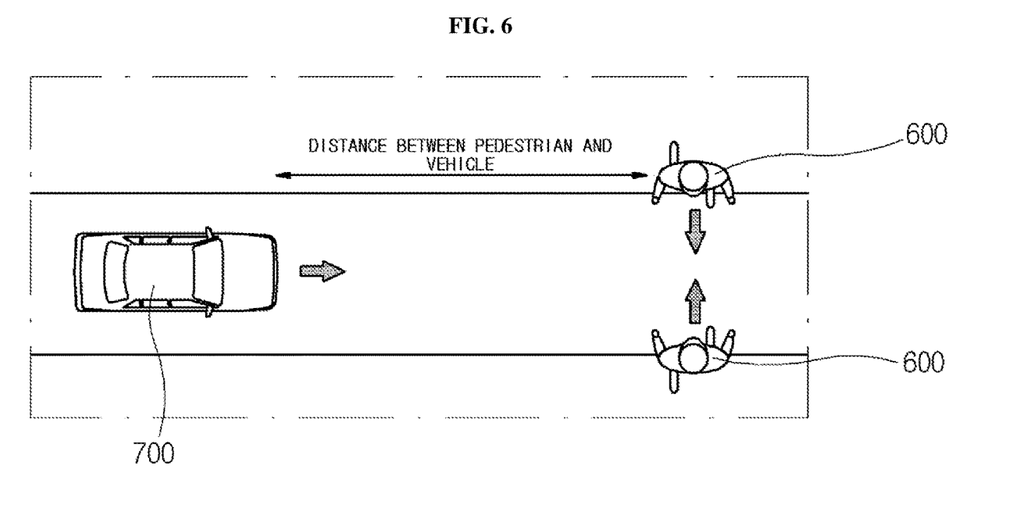
FIG. 6 is a diagram illustrating a concept of a pedestrian moving speed according to an exemplary embodiment of the present disclosure.

FIG. 6 is a diagram illustrating a concept of a pedestrian moving speed. Referring to FIG. 6, the front detection sensor 200 may be configured to detect a distance between a pedestrian 600 and a vehicle 700 that are moving within a driving lane and a moving speed of the pedestrian 600.

For example, when the pedestrian 600 moves from the left to the right with respect to a front view of the vehicle 700, the pedestrian 600 has a negative (−) moving speed and when the pedestrian 600 moves from the right to left with respect to the front view of the vehicle 700, the pedestrian 600 has a positive (+) moving speed. In addition, the front detection sensor 200 may be configured to detect the distance between the vehicle 700 and the pedestrian 600 that are moving in the driving lane of the vehicle.

Figure 7:
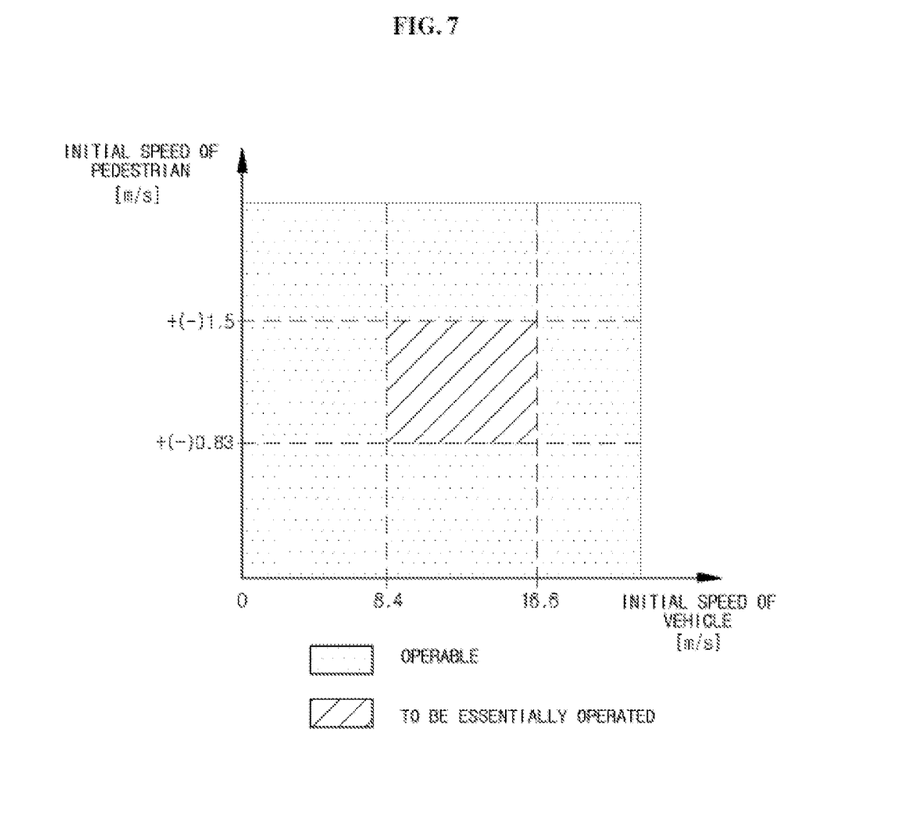
FIG. 7 is a diagram illustrating an example of a mapping table for operating the PDCMS function according to the exemplary embodiment of the present disclosure.

FIG. 7 is a diagram illustrating an example of a mapping table for operating the PDCMS function according to the exemplary embodiment of the present disclosure. The controller 400 may be configured to access and use the mapping table to determine the risk of collision of the pedestrian with the vehicle, and furthermore, whether the PDCMS function is operated.

Referring to FIG. 7, the controller 400 may be configured to determine the operation of the PDCMS function based on an initial speed at a boundary of a driving lane in which the pedestrian is moving and an initial speed of the vehicle. In particular, when an absolute value of the initial speed at the boundary of the driving lane on which the pedestrian is moving and the initial speed of the vehicle are in an area in which the PDCMS function is essentially operated at the time of determining whether the PDCMS function is operated, the controller 400 may be configured to determine that the PDCMS function is operated. The operation possible area refers to the area in which the Vmin or the Vmax may be adjusted according to the selection of the manufacturer.

For example, when the speed of the vehicle is reduced to less than about 8.4 m/s (30 km/h) as the Vmin or increases to greater than about 16.6 m/s (60 km/h) as the Vmax, then the controller 400 may be configured to determine that the PDCMS is in the deactivation state and thus, the PDCMS function is not operated. Further, when the initial speed of the vehicle is between the Vmin and the Vmax and the absolute value of the initial speed at the boundary of the driving lane in which the pedestrian is moving is between about 0.83 m/s and 1.5 m/s, the controller 400 may be configured to determine that the PDCMS function is operated.

Figure 8:
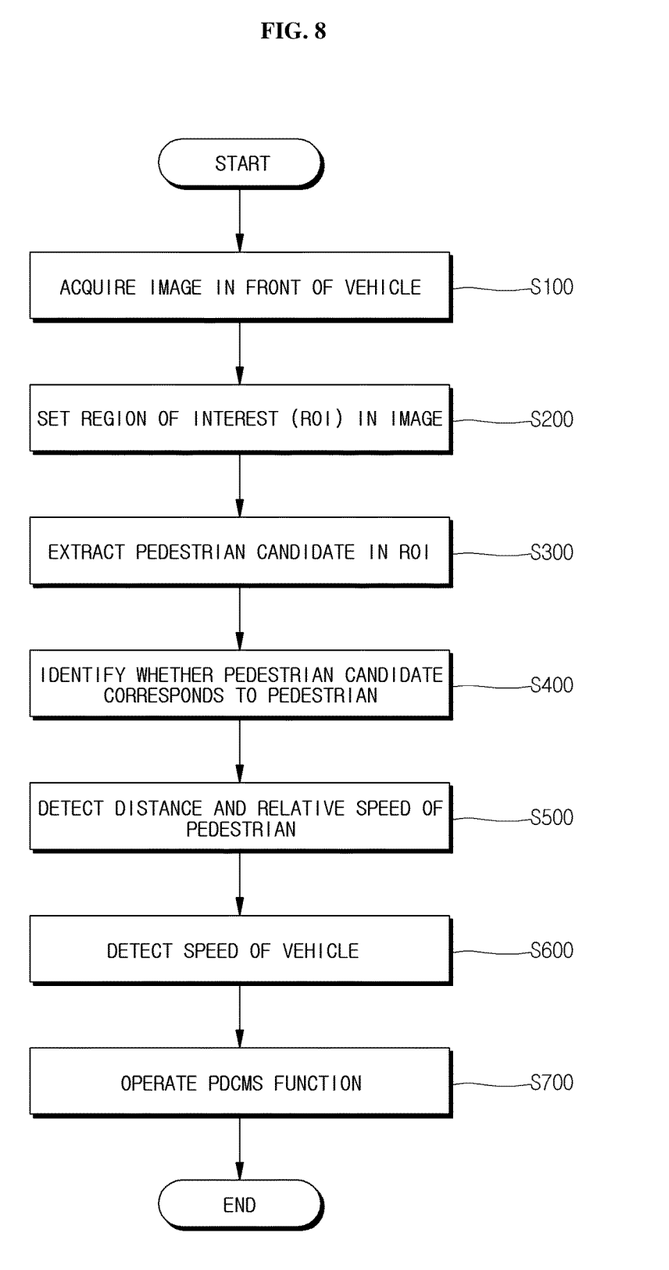
FIG. 8 is a flow chart illustrating a flow of a method for operating a PDCMS function according to an exemplary embodiment of the present disclosure.

FIG. 8 is a flow chart illustrating a flow of a method for operating a PDCMS function according to an exemplary embodiment of the present disclosure as executed by the controller. Referring to FIG. 8, a method for operating a pedestrian detection and collision mitigation system (PDCMS) function according to an exemplary embodiment of the present disclosure may include: acquiring an image in front of a vehicle (S100); setting a region of interest (ROI) that corresponds to a size of an object in the image (S200); extracting a pedestrian candidate based on an operation of the object in the set ROI (S300); including a database and comparing the extracted pedestrian candidate with a posture of a sample pedestrian in the database to identify whether the pedestrian candidate corresponds to a pedestrian in a driving lane of the vehicle (S400); detecting, by the front detection sensor, a distance and a relative speed between the pedestrian and the vehicle (S500); detecting, by a vehicle sensor, a speed of a vehicle (S600); and operating the PDCMS function based on the information detected by the front detection sensor and the vehicle sensor (S700).

In the acquiring of the image in front of the vehicle (S100), the image may be acquired by the camera configured to photograph an area in front of the vehicle. In the setting of the region of interest (ROI) that corresponds to the size of the object in the image (S200), the ROI that corresponds to the size of the object in the image in the area at the front of the vehicle acquired in the step S100 may be set. In other words, the floor position of the pedestrian area in the image are determined based on the size of the image, the installation environment information on the camera, the specifications of the camera, and the actual size of a pedestrian. Therefore, since the pedestrian may be identified based on the number of pixels, the minimum and maximum sizes of the pedestrian from the floor position of the pedestrian area may be set to be an appropriate ROI.

In the extracting of the pedestrian candidate based on the operation of the object in the set ROI (S300), the pedestrian candidate may be extracted based on the operation of the object having the set ROI in the image. In addition, the comparing of the extracted pedestrian candidate with the posture of the sample pedestrian in the database to identify whether the pedestrian candidate corresponds to the pedestrian in the driving lane of the vehicle (S400), the features of the extracted pedestrian candidate may be compared with the posture of the sample pedestrian stored in the database sequentially, for example, in the cascade manner to determine whether the pedestrian candidate corresponds to the pedestrian.

In the detecting the pedestrian information including the distance and the relative speed between the pedestrian and the vehicle (S500), the distance and the relative speed between the pedestrian and the vehicle may be detected by tracking the pedestrian based on the number of feature points of the pedestrian in the ROI. In addition, in the detecting of the vehicle information including the speed of the vehicle (S600), the vehicle sensor may be configured to measure the RPM of the vehicle wheel based on the vehicle engine and calculate the RPM of the vehicle based on the known circumference of the wheel and the measured RPM and time to detect the information on the driving conditions of the vehicle.

In the operating of the PDCMS function based on the pedestrian information and the vehicle information (S700), whether the conditions that the PDCMS function may be operated are satisfied may be determined by combining the pedestrian state and the vehicle state. For example, whether the conditions that the PDCMS function on the mapping table may be operated are satisfied may be determined by combining the pedestrian state and the vehicle state. In other words, in response to determining that an obstacle is a pedestrian, the risk of collision of the pedestrian with the vehicle is determined on the mapping table using the current position of the pedestrian, the current position of the vehicle, and the speed information on the vehicle.

Further, in response to determining that the pedestrian state and the vehicle state satisfy the conditions that the PDCMS function may be started, the PDCMS function of the vehicle may be operated. The PDCMS function may include the activation of the operation of the warning unit operated to provide a notification to the driver regarding the collision of the pedestrian with the vehicle and the activation of the operation of the brake regardless of whether the driver operates the brake.

Meanwhile, it should be understood that the PDCMS was described as an example for convenience of description in the present specification. As described above, it should be understood that the PDCMS is only one of several ADAS functions, and that the PDCMS implementations presented by the present disclosure may also be used to implement other ADAS functions involved. For example, the system presented by the present disclosure may be applied to implement one or a combination of ones of the ADAS functions such as the PDCMS, a lane change decision aid system (LCDAS), a land departure warning system (LDWS), an adaptive cruise control (ACC), a lane keeping assistance system (LKAS), a road boundary departure prevention system (RBDPS), a curve speed warning system (CSWS), a forward vehicle collision warning system (FVCWS), and low speed following (LSF).

The apparatus for operating a PDCMS according to the exemplary embodiment of the present disclosure may more accurately determine the pedestrian based on the posture information on the pedestrian in the image of the front area of the vehicle. Therefore, the apparatus for operating a PDCMS according to the exemplary embodiment of the present disclosure may more accurately detect the pedestrian to effectively protect the pedestrian.

The foregoing includes examples of one or more exemplary embodiments. Of course, all possible combinations of components or methods for the purpose of describing the embodiments described above are not described, but those skilled in the art may recognize that many combinations and substitutions of various embodiments are possible. Accordingly, the described embodiments are intended to embrace all the alternatives, modifications and variations that fall within the spirit and scope of the appended claims.

What is claimed is:

1. An apparatus for operating a pedestrian detection and collision mitigation system (PDCMS) of a vehicle, comprising:
    a front detection sensor configured to detect a pedestrian in a driving lane of the vehicle and a distance and a relative speed between the pedestrian and the vehicle;
    a vehicle sensor configured to detect a speed of the vehicle;
    a controller configured to execute the PDCMS function based on information detected by the front detection sensor and the vehicle sensor; and
    a warning unit operated by the controller to provide a notification to a driver regarding a collision of the pedestrian with the vehicle,
    wherein the front detection sensor includes:
        an image input unit configured to acquire an image of an area at a front of the vehicle;
        a region of interest (ROI) setting unit configured to set a ROI that corresponds to a size of an object in the image;
        a candidate extraction unit configured to extract a pedestrian candidate based on a movement of the object in the set ROI; and
        a pedestrian determination unit configured to compare the extracted pedestrian candidate with a posture of a sample pedestrian in a database to identify whether the extracted pedestrian candidate corresponds to the pedestrian, and
    wherein the controller is further configured to activate the PDCMS function, if an absolute value of an initial speed of the pedestrian at a boundary of the driving lane and an initial speed of the vehicle are both within a predefined range condition in which the PDCMS function is activated at the time of determining whether the PDCMS function is activated.

2. The apparatus of claim 1, wherein the PDCMS function includes an activation of the warning unit operation and an activation of a brake operation.

3. The apparatus of claim 2, wherein the PDCMS function further includes an operation of a rear brake lamp.

4. The apparatus of claim 2, wherein the PDCMS function further includes an operation of an electrical stability control (ESC).

5. The apparatus of claim 1, wherein the pedestrian determination unit includes the database for storing, as the posture of the sample pedestrian, information associated with at least one of front, back, left, and right portions, an upper left half of a body, and an upper right half of a body of the sample pedestrian.

6. The apparatus of claim 5, wherein the pedestrian determination unit is configured to compare the extracted pedestrian candidate with front, back, left, and right portions, an upper left half of a body, or an upper right half of a body of the sample pedestrian in the database in a cascading manner.

7. The apparatus of claim 1, wherein the front detection sensor further includes a pedestrian tracking unit configured to track the pedestrian identified by the pedestrian determination unit.

8. The apparatus of claim 7, wherein the pedestrian tracking unit is configured to track the pedestrian based on a number of feature points of the pedestrian in the set ROI.

9. The apparatus of claim 1, wherein the controller is configured to activate operation of a brake to reduce the speed of the vehicle to at least a predetermined speed or less from a time when the operation of the brake is activated to a time when the collision of the pedestrian with the vehicle occurs.

10. The apparatus of claim 1, wherein the controller is configured to permit a driver to operate a brake for a maximum possible deceleration even after starting the activation of the operation of the brake.

11. The apparatus of claim 1, wherein the controller is configured to operate the warning unit to inform the driver that the PDCMS function is in an available state.

12. The apparatus of claim 1, wherein the warning unit includes a display unit configured to visually inform the driver regarding the collision of the pedestrian with the vehicle or a speaker unit configured to audibly inform the driver regarding the collision of the pedestrian with the vehicle.

13. A method for operating a pedestrian detection and collision mitigation system (PDCMS) of a vehicle, comprising:
    acquiring, by a controller, an image of an area in a front of a vehicle;

setting, by the controller, a region of interest (ROI) that corresponds to a size of an object in the image;

extracting, by the controller, a pedestrian candidate based on a movement of the object in the set ROI;

comparing, by the controller, the extracted pedestrian candidate with a posture of a sample pedestrian in a database to identify whether the extracted pedestrian candidate corresponds to a pedestrian in a driving lane of the vehicle;

detecting, by the controller, pedestrian information including a distance and a relative speed between the pedestrian and the vehicle;

detecting, by the controller, vehicle information including a speed of the vehicle; and executing, by the controller, a PDCMS function based on the pedestrian information and the vehicle information, wherein the executing of the PDCMS function comprises:

activating the PDCMS function, if an absolute value of an initial speed of the pedestrian at a boundary of the driving lane and an initial speed of the vehicle are both within a predefined range condition in which the PDCMS function is activated at the time of determining whether the PDCMS function is activated.

14. The method of claim 13, wherein the PDCMS function includes an activation of an operation of a warning unit operated to provide a notification to a driver regarding a collision of the pedestrian with the vehicle and an activation of an operation of a brake regardless of whether the driver operates the brake.

* * * * *